United States Patent
Wang

[11] Patent Number: 6,041,413
[45] Date of Patent: Mar. 21, 2000

[54] SECURITY CONTROL FOR COMPUTER POWER SUPPLY SUBSYSTEM

[75] Inventor: Cheng-Chih Wang, Chupei, Taiwan

[73] Assignee: Winbond Electronics Corp., Hsinch, Taiwan

[21] Appl. No.: 08/886,009

[22] Filed: Jun. 6, 1997

[30] Foreign Application Priority Data

May 30, 1997 [TW] Taiwan ................................ 86107361

[51] Int. Cl.[7] ...................................................... G06F 11/00
[52] U.S. Cl. ........................... 713/202; 713/300; 713/330
[58] Field of Search .............................. 395/188.01, 186, 395/750.01; 713/202, 200, 300, 330

[56] References Cited

U.S. PATENT DOCUMENTS

| | | | |
|---|---|---|---|
| 4,959,860 | 9/1990 | Watters et al. ............................... | 380/4 |
| 5,742,758 | 4/1998 | Dunham et al. ........................... | 395/186 |
| 5,748,888 | 5/1998 | Angelo et al. ............................. | 395/186 |
| 5,751,950 | 5/1998 | Crisan ................... | 395/188.01 |
| 5,857,020 | 1/1999 | Peterson, Jr. ................................. | 380/4 |
| 5,867,106 | 2/1999 | Bi et al. .............................. | 340/825.31 |

*Primary Examiner*—Joseph E. Palys
*Assistant Examiner*—Omar A. Omar
*Attorney, Agent, or Firm*—Finnegan, Henderson, Farabow, Garrett & Dunner, L.L.P.

[57] ABSTRACT

A computer system power-on security control apparatus is disclosed to provide shielding against unauthorized access to the computer systems. Firmware-level protection is provided instead of the conventional implementation at the operating system level. Repeated power-on and -off cycles inevitable in the process of trial entry of the password of the computer system can be avoided altogether, reducing the risk of potential damages to delicate subsystems in the computer while repeated trial of the password is attempted.

14 Claims, 4 Drawing Sheets

SECURITY CONTROL FOR COMPUTER POWER SUPPLY SUBSYSTEM

BACKGROUND OF THE INVENTION

1. Field of the Invention

The invention relates in general to the power supply control for a computer system and, in particular, to the security control of the supply of power to a computer system. More particularly, the invention relates to the effective security control of the supply of power to a computer system for restricting unauthorized access to the system and for avoiding possible damage to the system as a result of repeated trial access by powering up the system.

2. Technical Background

In typical microprocessor-based personal computer or workstation systems, simple mechanical on/off contact switches were used to implement the supply or cut-off of electrical power to the power supply unit of early designs of these computer systems. When the mechanical contact switch installed in the power supply unit of a computer system is turned off, open circuit status of the switch terminates the supply of electrical power to the power supply circuitry, and the entire computer system is turned off. On the other hand, when the same main switch is turned on, the close-circuited switch supplies electrical power such as the house 110V AC to the power supply circuitry, which converts the AC power into the appropriate DC powers (such as, positive and negative 5 and 12 volts DC) for supplying to all the subsystems in the computer. With the steady supply of all the necessary DC powers, the computer system may then initiate its start-up sequence, and the system boots up subsequently.

Mechanical contact switches used in these earlier computer systems relies on human operation by hand, so that the computer system can be turned on or off. Without the intervention of human operator, the computer had no means to turn itself power-on or -off. Meanwhile, once the main power switch is switched and maintained on, the system would initiate and execute its starting sequence of operations. If no effective password control scheme was incorporated at either the system firmware (that is, the Basic Input/Output System (BIOS) in the case of a x86-based IBM-compatible computer) or the operating system level, once powered up, the entire system, together with all its data, is exposed to anyone having access to the system.

Models of the Macintosh series of personal computer systems manufactured by Apple Computer Inc. of Cupertino, Calif. employ a designated key on the keyboard to control the powering up and down. Though convenient, however, they also lack the effective security as in the early IBM-compatibles. Once a system has its power cord connected in the utility socket, anyone who can get access to the computer can simply bring up the system by depressing the power up key on the keyboard. Such "soft power control" is open to anyone having access to the keyboard of the system. Firmware and/or operating system level program routines similar to those mentioned above in the x86 world would have to be used to provide access restriction for these computer systems.

On the other hand, Intel Corporation of Santa Clara, Calif. had proposed a computer motherboard specification known as the ATX standard whose power supply subsystem no longer relies on the simple mechanical contact switch for the direct power up and down control of the computer system. Instead, the ATX implements a form of soft power control under supervision of a circuitry integrated in the computer system itself. Functionality more than simply and manually switching on and off on the main power switch are provided to a motherboard of the ATX standard so that control over the computer system can be more versatile.

For example, in the case of ATX specification version 2.01, the standby power 5VSB is a 5-volt DC power source that fans out a maximum of 0.7 amperes of current. This provides power for those basic power management circuitry in the computer system when the main power supply is cut off. These power management circuitry may be programmed to implement various convenience functionality of the computer system. For instance, the system can be programmed to start itself automatically in the midnight in a manner unattended by any operator so as to send international facsimile transmissions in the discount rate time periods of the local telephone company. Or, the computer system may be waken up in the evening by the incoming requests for remote modem connection in order to receive file transmissions.

However, such concepts of soft power management as implemented by these recent standards such as ATX still lack the provision for positive data protection by proper security measures as did the above-described prior-art computer systems. When a computer system adopting the ATX standard is started by a user (either authorized or not) by switching-on the main power switch, the power supply is then turned on, and the system initiates to perform its start up sequence of operations. At this moment, if neither the system firmware nor the operation system has been equipped with adequate security program such as password checking, anyone has direct access to the system can have access to the data contained in the computer. Such systems are as unprotected as were the earlier generation of computers having mechanical main power switch.

When such a conventional computer system equipped with a firmware or operating system-level security system is subject to unauthorized access, whoever trying to break into the system must enter the correct password. However, most conventional computer systems employ a simple rule of password entry, namely, the user can try a limited number of times to enter the password. If after the specified times of trial, the unauthorized user still could not enter the correct password, the system would simply lock. Keyboard of the computer system will no longer be responding to any new entries. In this case, the unauthorized user will have to turn off the power to the computer system and then turn it back on again. This allows the unauthorized user to get to the new password entry-point again. This process of power-on and -off must be performed repeatedly before the correct password is entered if the unauthorized user wished to keep trying to break into the system. During this process of repeated switching-on and -off of the main power supply, the computer system is exposed to increased possibilities of premature failure. This is because a normal computer system has not been designed to operate this way.

As is familiar to experienced ones in the field, microprocessor-based computer systems operate on power supply subsystems that do not allow for, at least do not recommend, repeated switching-on and -off during a short period of time. Successive power-on and -off actions within a short period of time are considered un-normal operation though they are basically allowable for well-designed power supply units. These power supplies are equipped with protection circuitry that prevents themselves from powering-on within a specified time period of, for example, a few seconds after being turned off. Though circuit boards in a computer system can thus be protected from potential damages in successive power-on and -off sessions when a unauthorized user tries to break into the system, other components such as disk drives are not as well protected. This is because spindle motors for modem hard disk drives are not designed for such operation schemes. They are supposed to be turned on and maintained power-on for a long period of time.

SUMMARY OF THE INVENTION

It is therefore an object of the invention to provide a security control apparatus for the computer power supply subsystem that determines whether or not to initiate the main power supply to a computer system based on the validity of the password input.

It is another object of the invention to provide a security control apparatus for the computer power supply subsystem that prevents potential physical damages to components in a computer system caused by unauthorized trials to bring up the system.

In order to achieve the above-specified objects, the invention provides a security control apparatus for computer power supply subsystem that comprises a keyboard intercept unit for intercepting the keyboard signals communicating between the keyboard controller interface of the mainboard circuitry and the keyboard when the computer system is powered off. A keyboard input data decoder receives and decodes the keyboard signals intercepted by the keyboard intercept unit. A first-in first-out buffer connected to the output of the keyboard input data decoder stores the decoded data of the keyboard signals in a pre-determined format. A password memory is used for storing the preset password designated for the authorized power-up of the computer system. A comparing unit has each of the two inputs connected to the output of the first-in first-out buffer and the password memory respectively, compares the matching of the keyboard signals and the preset password and generates a signal indicating the matching condition of the comparison. And, a power supply control unit receives the matching condition generated by the comparing unit for generating a control signal based on the logical status of the matching condition in order to control and power up the power supply of the computer system upon positive result of the matching condition.

BRIEF DESCRIPTION OF THE DRAWINGS

Other objects, features, and advantages of the present invention will become apparent by way of the following detailed description of the preferred but non-limiting embodiments. The description is made with reference to the accompanying drawings in which.

DETAILED DESCRIPTION OF THE PREFERRED EMBODIMENTS

Figure 1:
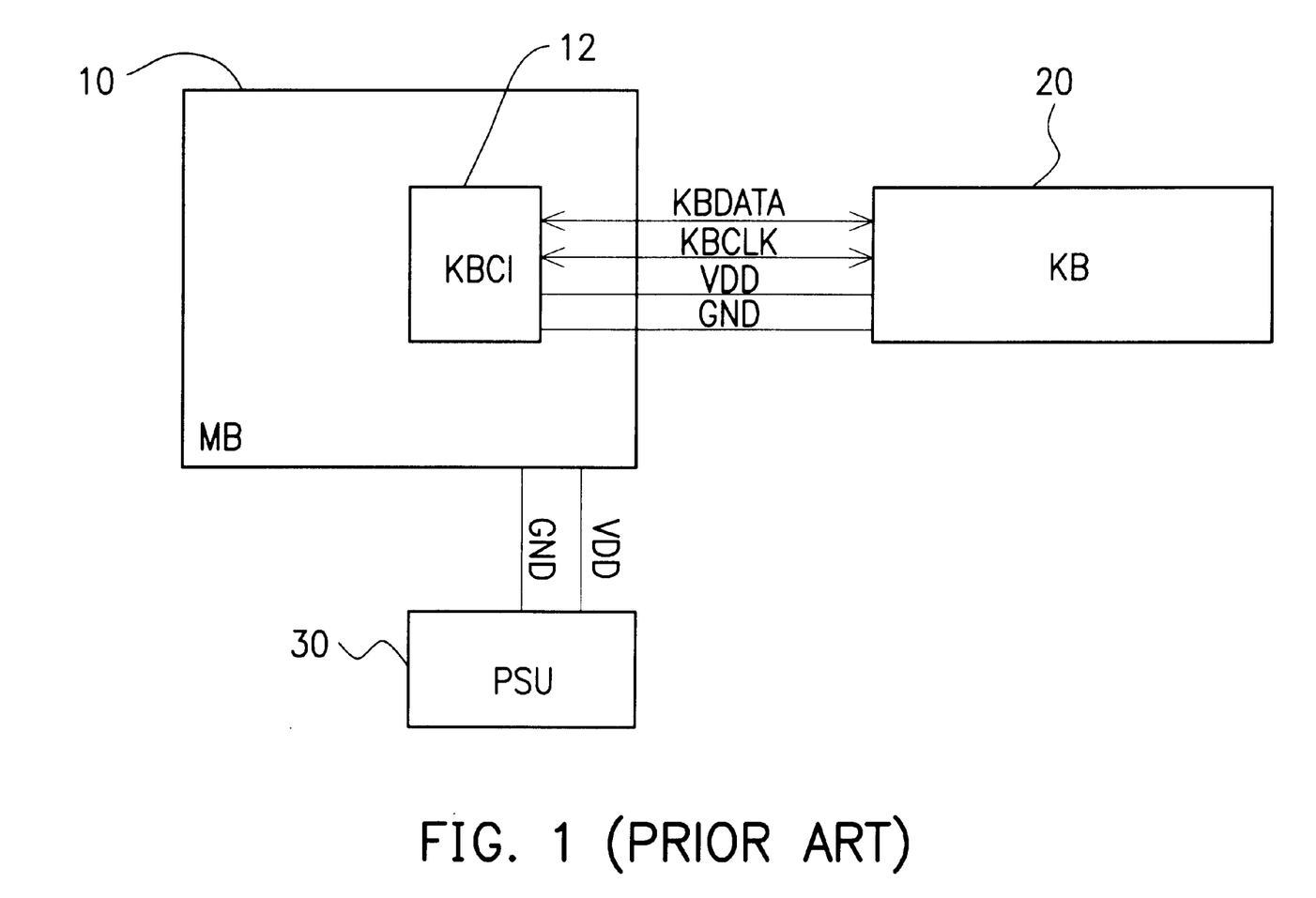
FIG. 1 is a simplified block diagram showing the circuit configuration of the keyboard controller interfacing with its corresponding external keyboard unit in a conventional computer system.

As is illustrated in FIG. 1, the circuit configuration shows that the keyboard interfacing section of the typical conventional computer system, such as of a x86-based IBM-compatible personal computer, is a keyboard controller interface (KBCI) 12 that interfaces between the core logic of the computer system and its external keyboard unit (KB) 20. This is a design suitable for the mainboard or motherboard (MB) 10 of the modern computer system unit to interface with its physically separate keyboard unit 20. The keyboard unit 20 has a microcontroller (not shown in the drawing) installed internally. Due to the fact that a normal keyboard unit is only required to handle human typing inputs, therefore, the processing power of the microcontroller installed in the keyboard unit need not be excessive.

Typically, serial communication is used to establish connection between the mainboard 10 of the system unit and the keyboard unit 20 in a computer system. For instance, in the case of the depicted prior-art circuitry example of FIG. 1, a pair of signals KBDATA and KBCLK are used to establish the connection between the keyboard unit 20 and the keyboard controller 12 of the motherboard 10 in the system unit. Such serial communication fulfills the need for handling human typing inputs well. The use of less-powerful microcontroller and serial communication channels is beneficial in cost reduction of the entire computer system.

In the depicted conventional computer system of FIG. 1, both power $V_{DD}$ and ground GND paths are also provided in addition to the KBDATA and KBCLK signals. In order to avoid radio frequency interference, this pair of power supply is normally provided to the keyboard unit 20 via proper isolation. In the case of the circuitry of FIG. 1, the keyboard controller 12 provides this power to the external keyboard unit 20.

Figure 2:
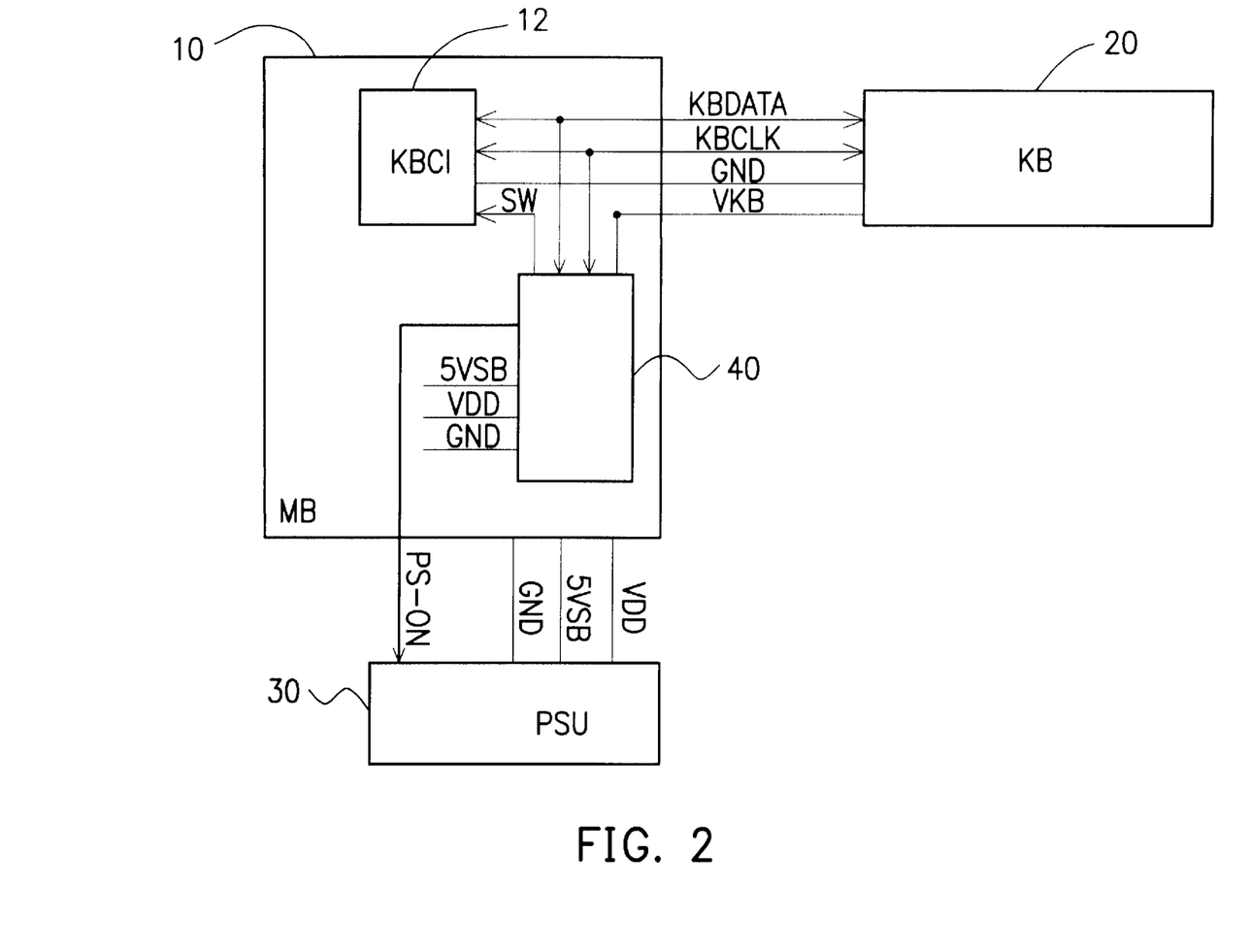
FIG. 2 is a block diagram showing the circuit configuration employing a security control apparatus in accordance with a preferred embodiment of the invention for the keyboard controller to interface with its corresponding external keyboard unit in a computer system.

When compared to the system logic circuitry of the conventional computer systems, the security control apparatus of the invention for the computer power supply subsystem may be an independent circuitry that can be added to the typical computer system of FIG. 1. In a preferred embodiment of the invention, this security control apparatus can be inserted between the external keyboard unit 20 and the keyboard controller 12 of the motherboard 10, while tapping into the signal paths connecting the two together. A block diagram of the embodiment of such an implementation can be seen in FIG. 2. As illustrated, the security control apparatus 40 constructed based on an embodiment of the invention can be incorporated into the logic circuitry of a computer system and interacts with the keyboard controller 12 of the motherboard 10, the external keyboard unit 20, as well as the power supply unit (PSU) 30. FIG. 2 depicts the configuration of such an implementation.

As illustrated in the drawing, the security control apparatus 40 embodying the invention may itself be an independent circuit module that can be used to intercept the keyboard signals KBDATA and KBCLK communicating between the external keyboard unit 20 and the keyboard controller 12 of the computer motherboard 10. The security control apparatus 40 can be monitoring the signal communication conducted between the two functional blocks to see if any user, either authorized or not, has depressed on the keyboard 20 with a string of keystrokes that conform to the valid password.

In one preferred embodiment of the invention, when the computer is turned off, the security control apparatus 40 still maintains powered on by the power supply unit 30, enjoying the necessary power source for implementing its designed security functionality. In the case of an ATX motherboard, the security control apparatus 40 of the invention may be powered by the 5VSB power source when the system is in the power-down condition. The 5VSB power source of the ATX can provide sufficient electric current for the operation of the apparatus 40 in order to monitor the keystrokes at the keyboard 20 when the system is powered off. Meanwhile, the power supply unit 30 is also required to supply sufficient power to the external keyboard unit 20 for the keystroke scanning circuitry to operate under control of the keyboard microcontroller.

As a user, either the rightful one or anyone trying to break into the computer system, depresses keystrokes over the external keyboard 20, trying to input to the computer system a string of characters conforming to the preset password, the security control apparatus 40 can be monitoring the depressed keystrokes and compare them with the pre-stored password. If the result of the comparison between the stored password and the input keystrokes is positive, an enabling signal can be generated by the security control apparatus 40, so as to turn on the power supply unit 30, which then initiates and brings up the entire computer system.

Once the power supply unit 30 is turned on, the computer system may proceed with the normal boot up sequence so that the computer may function normally. For example, under the specification of the ATX, when the security control apparatus 40 determines a keystroke string input is a valid password, the enabling signal generated by the apparatus 40 may be tied to the PS-ON input in the ATX power supply unit 30. As persons skilled in the art may well be aware, a logically positive, i.e., logically low-level, signal sent over to the PS-ON input of an ATX power supply 30 turns on the power supply unit which then powers up the computer system.

On the other hand, if the security control apparatus 40 determines that the depressed password keystrokes are not valid, the PS-ON input to the ATX power supply 30 is then maintained at the logically negative status. The logical high-level signal maintains the ATX power supply unit 30 at its power-off status. In this case, except the external keyboard unit 20 and the security control apparatus 40, the entire computer system, including the CPU, the disk subsystem, and even the keyboard controller 12 in the motherboard 10 are all maintained off. In other words, regardless of whatever and how many times the intruder tries on the external keyboard unit 20 of the computer system, the power supply unit 30 is kept on the powered down status so long as the correct password is not given. Since the power supply unit 30 is maintained off, vital components of the computer system, in particular the delicate and relatively vulnerable disk subsystem, will not be repeatedly powered up and then down in a rapid manner during the process of the repeated password guessing session. Possibilities of damages to the computer components as a result of the rapid power-on and -off cycles may thus be virtually avoided.

In a preferred embodiment, the security control apparatus 40 of the invention may further include the generation of another control signal SW that can be relayed to the keyboard controller 12 of the motherboard 10. When the computer system is under the power-down status, this signal allows the security control apparatus 40 to keep on intercepting the keyboard signals KBDATA and KBCLK for monitoring the validity of the password input, if any is depressed on the keyboard 20. On the other hand, when the computer system is powered on successfully (i.e., via correct input of valid password), the control signal SW can be used to return the normal flow of the keyboard signals KBDATA and KBCLK to the keyboard controller 12 and the external keyboard unit 20, as is normal in the case of a conventional computer system.

It should, however, be noticed that as the security control apparatus 40 is constantly monitoring the key-depressing status over the external keyboard unit 20 while the computer system is turned off, power supply $V_{KB}$ to the keyboard unit 20, as is in the case of FIG. 2, is supplied by the standby power 5VSB of the ATX power supply unit 30. This is necessary as the main 5-volt supply $V_{DD}$ of an ATX during the master off state is cut off. The standby 5-volt power, 5VSB, however, maintains active during the master off status and is able to provide a specified driving capacity. After the normal power-on of the computer system, power to the external keyboard unit can be switch from the standby power 5VSB to the master power $V_{DD}$. If, however, the external keyboard unit remains to be powered by the standby power after the normal boot up of the computer system, it is also feasible as well.

Figure 3:
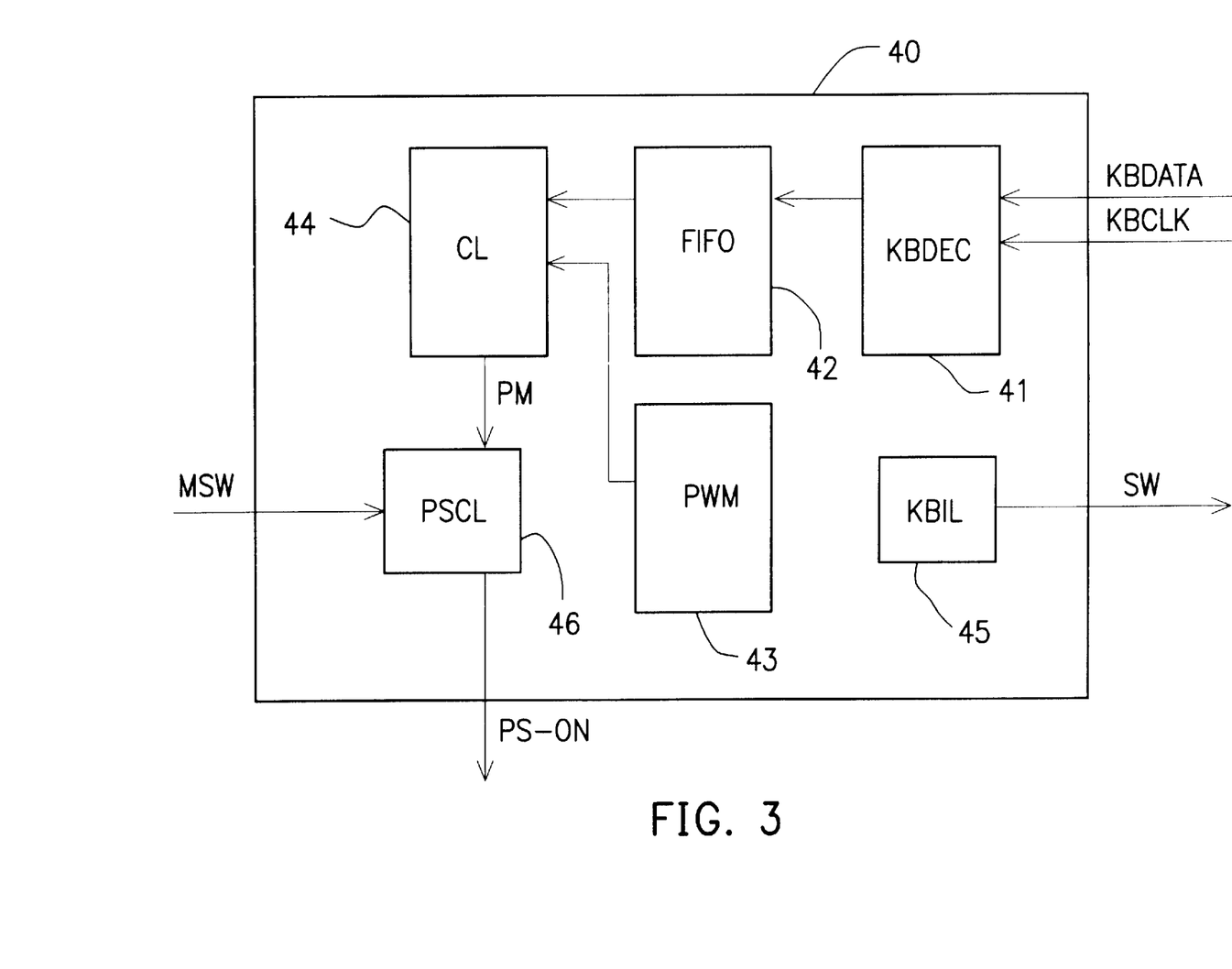
FIG. 3 is a block diagram showing the circuit configuration of the security control apparatus in accordance with the preferred embodiment of the invention.

A preferred embodiment of the circuitry for the security control apparatus of the invention is examined below. FIG. 3 is a block diagram showing the circuitry configuration of the security control apparatus in accordance with the preferred embodiment of the invention. As is illustrated in the drawing, the apparatus generally includes a keyboard input data decoder (KBDEC) 41, a first-in first-out (FIFO) buffer 42, a password memory (PWM) 43, a compare unit (CL) 44, a keyboard intercept unit (KBIL) 45, and a power supply control unit (PSCL) 46.

First of all, the keyboard intercept unit 45 generates a keyboard signal intercept control signal SW based on the power-up and -down condition of the computer system. In a preferred embodiment, the keyboard intercept unit 45 can be a logic circuit that simply generates a logic signal SW with reversing logical states to represent the power-on and -off status of the computer system respectively. When the computer system is in its powered off status, the SW signal with one logical state can be used to control the interception of the keyboard signals KBDATA and KBCLK for monitoring. On the other hand, when the computer system is in its powered on status, the SW signal with a reversed logical state can be used to return the normal keyboard signal communication between the external keyboard unit 20 and the keyboard controller 12 of the motherboard 10, as is depicted in the block diagram of FIG. 2.

Figure 4:
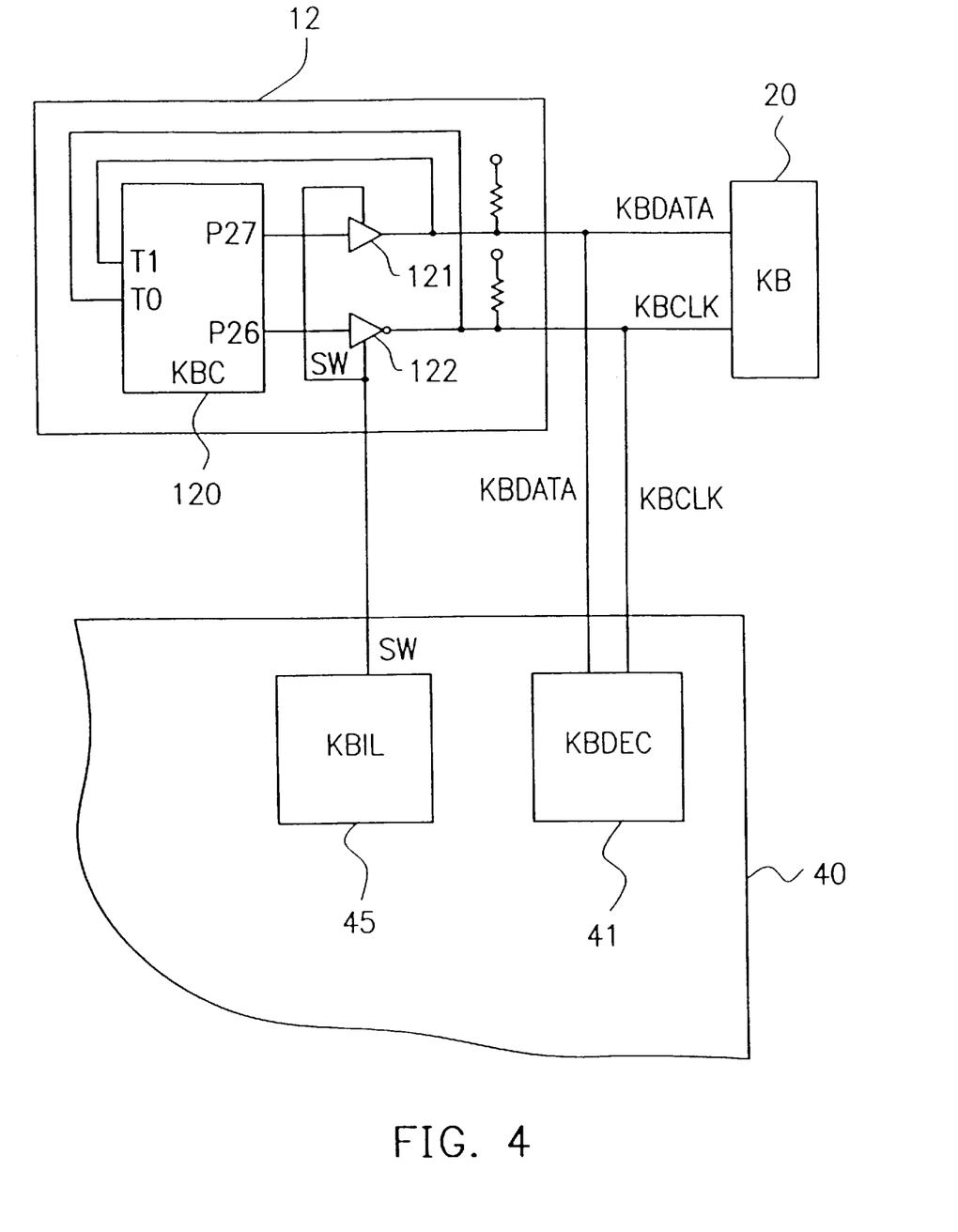
FIG. 4 is a schematic diagram showing the circuit configuration of the security control apparatus in accordance with the preferred embodiment of the invention.

For example, in the preferred embodiment, one three-state buffer can be used for each of the keyboard signals KBDATA and KBCLK to facilitate the control of whether or not to intercept this pair of signals between the external keyboard unit 20 and the keyboard controller 12 of the computer system motherboards 10. FIG. 4 illustrates a schematic diagram showing the circuitry configuration of the security control apparatus in accordance with the preferred embodiment of the invention. The inventive apparatus intercepts the keyboard signals KBDATA and KBCLK in order to determine whether or not a valid password to bring up the computer system is received in the system. As shown in the drawing, the keyboard controller interface 12 includes a typical microcontroller 120, which, in the typical IBM-compatible systems, may be an Intel 8042/8048 8-bit microcontroller or the equivalent. In the keyboard controller interface 12 of the IBM-compatible systems, the microcontroller 120 that controls the interface has each of the P27 and P26 ports thereof output the keyboard signals KBDATA and KBCLK via an open-collector buffer respectively. In a computer system employing the security control apparatus of the invention, these two open-collector buffers can be replaced by a pair of three-state buffers 121 and 122 respectively.

As is illustrated in FIG. 4, the two three-state buffers 121 and 122 in the preferred embodiment may be powered by the same power source $V_{KB}$ that powers the external keyboard unit 20. This is because these two buffers must remain active together with the external keyboard itself.

When the computer system is powered down, keyboard intercept unit 45 of the security control apparatus 40 generates a control signal SW that has a logical low level. As the three-state buffers 121 and 122 employed in the preferred embodiment depicted in FIG. 4 have logical positive enable input control, therefore, a logical low-level control signal SW brings both buffers to the high-impedance turned-off state. Under such a situation, the circuitry behind the input terminal of the buffers can be considered to be in virtually cut off from the keyboard signal lines KBDATA and KBCLK respectively. On the other hand, when the computer system is powered up as a result of correct password entry, the keyboard intercept unit 45 generates a corresponding control signal SW at its logical high status. This version of the control signal SW effectively connects P27 and P26 ports of the microcontroller 120 to the external keyboard units 20. The connection is via the pair of activated three-state buffers 121 and 122 at the keyboard signals KBDATA and KBCLK respectively. This effectively establishes the normal electrical signal connection between the external keyboard unit 20 and the motherboard 10 of the computer system.

Thus, in the preferred embodiment described above, the keyboard intercept unit 45 may be replaced simply by the main 5-volt power source $V_{DD}$ of the power supply unit 30. In other words, output enable control inputs of the two three-state buffers 121 and 122 for the keyboard interface can be tied directly, or via a properly selected pull-up resistor, to the $V_{DD}$.

Then, referring again to FIG. 3, as the computer system is brought into the power-down state, the keyboard intercept unit 45 may be able to intercept and switch the keyboard signals KBDATA and KBCLK into the security control apparatus 40. The intercepted keyboard signals may thus be sent directly to the keyboard input data decoder 41 for decoding. The decoder 41 may then convert the received alphanumeric characters as represented by the keyboard signals into the standard codes used in the computer system one after the other. These converted codes representing the entered keystrokes are then sent to the first-in first-out buffer 42 for storage in a predetermined data format and awaits further processing.

On the other hand, through proper operation procedures conducted in advance, the designated password can be stored in the password memory 43. In a preferred embodiment of the invention, this password memory 43 may be a non-volatile random-access memory (NVRAM) device that can maintain its stored information permanently after the removal of power. Or, in the case of an IBM-compatible computer, the password memory 43 may also be a designated memory space in the CMOS memory used for maintaining information that records the computer system hardware configuration. As another embodiment, the password memory 43 may also be a simple static random-access memory (SRAM) that has a back-up battery to maintain its memory content after the computer system is powered down.

In the process of activating the computer system power supply via password entry, the password may be concluded by, for example, a depress on the return key over the keyboard. In other words, the return key, which is never a key allowed for the password, may be used to signify the end of a password character string entry. Upon receiving this signifying key signal, a firmware routine of the computer system may then be initiated to let the compare unit 44 load and compare the input password entry with the pre-stored valid password from the first-in first-out buffer 42 and the password memory 43 respectively. As a result of the comparison, the compare unit 44 generates a password match signal PM, which may then be relayed to the power supply control unit 46.

Based on the logical state of the password match signal PM, the power supply control unit 46 generates a power supply control signal that can be used to directly interface and control the power supply unit of the computer system. For instance, in the case of an ATX power supply, this generated power supply control signal may be the logically negative PS-ON signal complying to the ATX specification which may be tied directly to the PS-ON input of the ATX power supply. In the case of the ATX power supply, a logical high-level signal at the PS-ON input keeps the power supply remained at its turned off state. On the other hand, the logical low signal on the PS-ON input will activate the power supply and brings up the computer system unconditionally.

In a preferred embodiment, further controlling signals derived from other control logic of the computer system can be relayed to the power supply control unit 46. These additional controlling signals may be used as contributing factors in the process of the generation of the power supply control signal, the PS-ON signal in the depicted example of FIG. 3 used to control the ATX power supply unit 30. For example, if the computer system is equipped with a main power switch, a signal MSW used to designate the logical on-off status of this switch may be input to the power supply control unit 46, as is illustrated in the drawing. In the case of logically positive convention for both the password match PM and the main switch status MSW signals, a logical NAND operation may be implemented on both signals by the power supply control unit 46 to obtain the logically negative PS-ON output.

While the invention has been described by way of example and in terms of preferred embodiment, it is to be understood that the invention need not be limited to the disclosed embodiments. For example, typical IBM-compatible computer systems employ a simple 8-bit microcontroller to implement the keyboard interface control on the system motherboard. The typical external keyboard unit used in these x86-based computers may therefore employ a microcontroller having correspondingly compatible processing capability to implement the control of the independent keyboard unit. Microcontrollers at both sides of the keyboard interface may be communicating to each other in a serial connection. However, other forms of communication between the two are also possible for the implementation of the invention.

For instance, since there are other peripheral devices present on the XA/XD peripheral buses where the keyboard interface microcontroller resides, microcontroller of higher performance may be necessary to replace the conventional Intel 8042/8048 device used in the case of an IBM-compatible computer. Under such a situation, the security control apparatus of the invention is still applicable.

Meanwhile, due to the fact the modern personal computers are built around ASIC (application-specific IC) devices, the security control apparatus of the invention is also feasible in these ASIC circuitry and may be included in the core logic chipsets of the computer system. Since the logic circuitry of the security control apparatus of the invention is relatively simple compared with the computer core logic, therefore, the incorporation of the inventive apparatus in the computer core logic ASIC device barely adds noticeably to the overall gate count. In other words, ASIC devices incorporating the apparatus of the invention does not add significantly to the total semiconductor fabrication cost. On the other hand, since the security control apparatus has a relatively simple logic circuitry, minor electric power is consumed. In other words, the incorporation of the security control apparatus of the invention is very suitable for the standby power source in power supply units such as the ATX specification.

Further, in addition to power supply unit of the ATX specification, other standards such as the NLX or PS/2, whichever featuring the enabling input for implementing the soft power control, are all applicable as well.

Therefore, the above descriptive paragraphs are intended to cover various modifications and similar arrangements included within the spirit and scope of the appended claims, the scope of which should be accorded the broadest interpretation so as to encompass all such modifications and similar structures.

What is claimed is:

1. A power-up security control apparatus for a computer system having a mainboard circuitry, a power supply, and a keyboard, the apparatus comprising:

a keyboard intercept unit for intercepting keyboard signals capable of communicating between a keyboard controller interface of the mainboard circuitry and the keyboard when the computer system is off;

a keyboard input data decoder for receiving and decoding the keyboard signals intercepted by the keyboard intercept unit;

a buffer connected to an output of the keyboard input data decoder for storing the decoded keyboard signals in a pre-determined format;

a password memory for storing a preset password for authorizing the computer system to power up;

a comparing unit having inputs connected to the output of the buffer and the password memory, the comparing unit comparing the decoded keyboard signals and the preset password and generating a matching condition signal indicating whether the decoded keyboard signals and the preset password match; and a power supply control unit receiving the matching condition signal and subsequently generating a control signal based on a logical status of the matching condition signal in order to control the power supply of the computer system.

2. The apparatus of claim 1, wherein the power supply control unit generates the control signal to the power supply to supply power to the computer system when the comparing unit generates a positive matching condition signal as a result of the comparison, and maintaining the power supply powered off when the comparing unit generates a negative matching condition signal as a result of the comparison.

3. The apparatus of claim 2, wherein the power supply control unit further includes a logic circuitry, and the power supply control unit outputs a result of a logical operation performed based on the result of the matching condition and a logical status of a main switch of the computer system.

4. The apparatus of claim 2, wherein the power supply complies with the ATX standard, and the power supply control unit comprises a logical NAND circuit performing a NAND operation on the matching condition and the logical status of the main switch of the computer system, and the power supply control unit generates a PS-ON signal to the ATX power supply.

5. The apparatus of claim 4, wherein the circuitry subsystems of the computer system except the apparatus and the keyboard are powered off when the computer system is off, and wherein the apparatus and the keyboard are powered by a 5VSB standby power source of an ATX power supply.

6. The apparatus of claim 2, wherein circuitry subsystems of the computer system except the apparatus and the keyboard are powered off when the computer system is off.

7. The apparatus of claim 2, wherein the password memory is a non-volatile random-access memory device.

8. The apparatus of claim 2, wherein the password memory is a designated memory space in a CMOS configuration memory of the computer system.

9. The apparatus of claim 2, wherein the password memory is a static random-access memory supported by a back-up battery when the computer system is turned off.

10. The apparatus of claim 1, wherein the power supply of the computer system includes an enabling input, and the power supply is initiated when the power supply control unit outputs an enabling signal to the enabling input of the power supply in order to initiate the power supply for powering up the computer system.

11. The apparatus of claim 1, wherein the decoded data of the keyboard signals is stored in a pre-determined format.

12. A system for controlling power-up of a computer system having a keyboard connected to a keyboard controller, said computer system connected to a power source, said system comprising:

a keyboard intercept unit for intercepting keyboard signals directed to the keyboard controller;

a memory for storing a password;

a comparing unit configured to compare received keyboard signals to the stored password;

a power supply control unit, connected to the comparing unit, outputting a power control signal to turn on the power source when the keyboard signals match the stored password, wherein said keyboard intercept unit includes means for intercepting keyboard signals when the power source is off.

13. A system for controlling power-up of a computer system having a keyboard connected to a keyboard controller, said computer system connected to a power source, said system comprising:

a keyboard intercept unit for intercepting keyboard signals directed to the keyboard controller;

a memory for storing a password;

a comparing unit configured to compare received keyboard signals to the stored password;

a power supply control unit, connected to the comparing unit, outputting a power control signal to turn on the power source when the keyboard signals match the stored password; and a standby power source configured to output power to the keyboard intercept unit, comparing unit and power supply control unit when the power source is off.

14. A power-up security control apparatus for a computer system having a mainboard circuitry, a power supply, and a keyboard, the apparatus comprising:

a keyboard input data decoder for receiving and decoding keyboard signals;

a buffer connected to an output of the keyboard input data decoder for storing the decoded keyboard signals in a pre-determined format;

a password memory for authorizing the computer system to power up;

a comparing unit having inputs connected to the output of the buffer and the password memory, the comparing unit comparing the decoded keyboard signals and a preset password and generating a matching condition signal indicating whether the decoded keyboard signals and the preset password match;

a power supply control unit comprising a logic circuitry and receiving the matching condition signal and subsequently generating a control signal based on a result of a logical operation performed by the logic circuitry on both a matching condition and a status of a main power switch of the computer system, in order to control the power supply of the computer system; and a keyboard intercept unit for intercepting the keyboard signals capable of communicating between a keyboard controller interface of the mainboard circuitry and the keyboard when the computer system is off.

* * * * *